(12) United States Patent
Sabano et al.

(10) Patent No.: US 11,372,164 B2
(45) Date of Patent: Jun. 28, 2022

(54) OPTICAL CONNECTOR SYSTEM AND OPTICAL CONNECTION STRUCTURE

(71) Applicant: Fujikura Ltd., Tokyo (JP)

(72) Inventors: Takahiko Sabano, Chiba (JP); Akito Nishimura, Chiba (JP); Susumu Nakaya, Chiba (JP); Hirotaka Asada, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 17/058,281

(22) PCT Filed: Mar. 26, 2019

(86) PCT No.: PCT/JP2019/012687
§ 371 (c)(1),
(2) Date: Nov. 24, 2020

(87) PCT Pub. No.: WO2020/039636
PCT Pub. Date: Feb. 27, 2020

(65) Prior Publication Data
US 2021/0239909 A1    Aug. 5, 2021

(30) Foreign Application Priority Data

Aug. 23, 2018   (JP) .............................. JP2018-156228

(51) Int. Cl.
*G02B 6/30* (2006.01)
*G02B 6/34* (2006.01)
*G02B 6/42* (2006.01)

(52) U.S. Cl.
CPC .................. *G02B 6/30* (2013.01); *G02B 6/34* (2013.01); *G02B 6/4214* (2013.01)

(58) Field of Classification Search
CPC . G02B 6/30; G02B 6/34; G02B 6/124; G02B 6/4214

(Continued)

(56) References Cited

U.S. PATENT DOCUMENTS

2006/0239605 A1   10/2006 Palen et al.
2012/0301073 A1   11/2012 DeMeritt et al.
(Continued)

FOREIGN PATENT DOCUMENTS

CN          1781042 A     5/2006
JP      2008-122756 A     5/2008
(Continued)

OTHER PUBLICATIONS

Dirk Taillaert et al., "Grating Couplers for Coupling between Optical Fibers and Nanophotonic Waveguides", Japanese Journal of Applied Physics, vol. 45, No. 8A, pp. 6071-6077, 2006 (8 pages).

*Primary Examiner* — Michael P Mooney
(74) *Attorney, Agent, or Firm* — Osha Bergman Watanabe & Burton LLP

(57) ABSTRACT

An optical connector system includes: an optical path-changing device including a fiber-holding part that holds a single-mode optical fiber along a first direction, and a reflection surface that reflects an optical signal; and a relay device on a substrate. The substrate includes a grating coupler for inputting/outputting an optical signal in a second direction that is inclined with respect to a direction perpendicular to a surface of the substrate. The optical path-changing device and the relay device each have an input/output surface to/from which the optical signal is inputted/outputted. A first convex lens is disposed on the input/output surface of the optical path-changing device. A second convex lens is disposed on the input/output surface of the relay device.

6 Claims, 7 Drawing Sheets

(58) Field of Classification Search
USPC .......... 385/33, 61, 74, 49–51, 78–79, 92–93
See application file for complete search history.

(56) References Cited

U.S. PATENT DOCUMENTS

2013/0182998 A1    7/2013  Andry et al.
2017/0075082 A1    3/2017  Aihara et al.
2017/0261704 A1*  9/2017  Doany .................... G02B 6/34

FOREIGN PATENT DOCUMENTS

| JP | 2009-276668 A | 11/2009 |
| JP | 2015-11203 A | 1/2015 |
| JP | 2016-9160 A | 1/2016 |
| JP | 2016-166939 A | 9/2016 |
| JP | 2017-516150 A | 6/2017 |
| WO | 2016/006037 A1 | 1/2016 |
| WO | 2016/122586 A1 | 8/2016 |

* cited by examiner

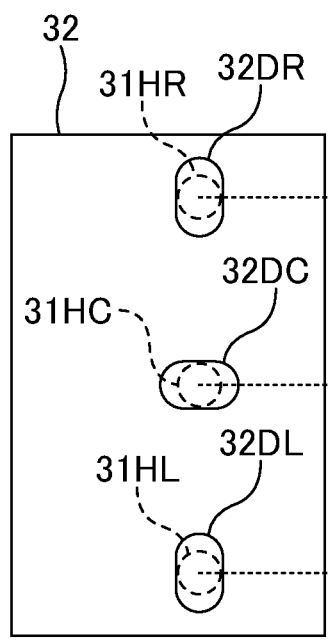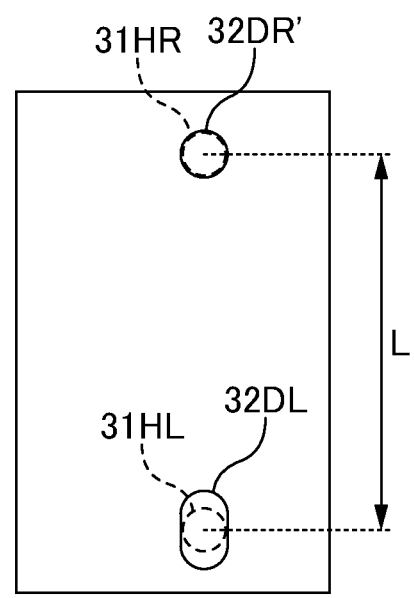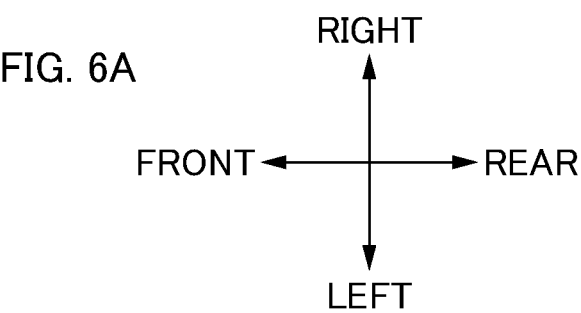
FIG. 6A
FIG. 6B

OPTICAL CONNECTOR SYSTEM AND OPTICAL CONNECTION STRUCTURE

TECHNICAL FIELD

The present invention relates to optical connector systems and optical connection structures.

BACKGROUND

Patent Literature 1 discloses an optical connection structure wherein an optical fiber and an optical element (surface-emitting laser) are connected by placing an end surface of the optical fiber in opposition to the optical element.

Patent Literatures 2 and 3 and Non-Patent Literature 1 disclose grating couplers for inputting/outputting optical signals. These documents describe that an optical signal outputted from the grating coupler is inclined with respect to the vertical direction of a substrate.

PATENT LITERATURE

Patent Literature 1: JP2009-276668A
Patent Literature 2: JP2016-166939A
Patent Literature 3: WO2016/006037

NON-PATENT LITERATURE

Non-Patent Literature 1: Dirk T. et al., "Grating Couplers for Coupling between Optical Fibers and Nanophotonic Waveguides," Japanese Journal of Applied Physics, Vol. 45, No. 8A, pp. 6071-6077, 2006.

Recent increases in the volume of data communication at data centers demand higher transmission speed of optical signals by optical fibers and longer transmission distance. Unfortunately, multi-mode optical fibers suffer from signal degradation. So, it is desirable to use single-mode optical fibers. Single-mode optical fibers, however, require higher accuracy in the design of optical paths for optical signals, compared to multi-mode optical fibers.

SUMMARY

One or more embodiments of the invention provide a novel structure with which a grating coupler and a single-mode optical fiber can be optically connected with high accuracy.

An optical connector system according to one or more embodiments includes: an optical path-changing device including a fiber-holding part holding a single-mode optical fiber along a first direction, and a reflection surface configured to reflect an optical signal; and a relay device configured to be provided on a substrate having a grating coupler for inputting/outputting an optical signal in a second direction that is inclined with respect to a direction perpendicular to a surface of the substrate. The optical path-changing device and the relay device each have an input/output surface to/from which an optical signal is to be inputted/outputted. The input/output surface of the optical path-changing device and the input/output surface of the relay device are each provided with a convex lens. The single-mode optical fiber and the grating coupler are optically coupled by inputting/outputting collimated light of the optical signal between the convex lens of the optical path-changing device and the convex lens of the relay device, and changing a direction of the optical signal by the reflection surface of the optical path-changing device.

Other features of the invention will be disclosed in the description below and the drawings.

The invention is capable of optically connecting a grating coupler and a single-mode optical fiber with high accuracy.

BRIEF DESCRIPTION OF THE DRAWINGS

FIG. 6A is a diagram illustrating an arrangement of a positioning part (positioning holes 32D and positioning pins 31H) in the optical connector system 30 according to one or more embodiments, and FIG. 6B is a diagram illustrating an arrangement of a positioning part according to a comparative example.

DETAILED DESCRIPTION

Figure 1A:
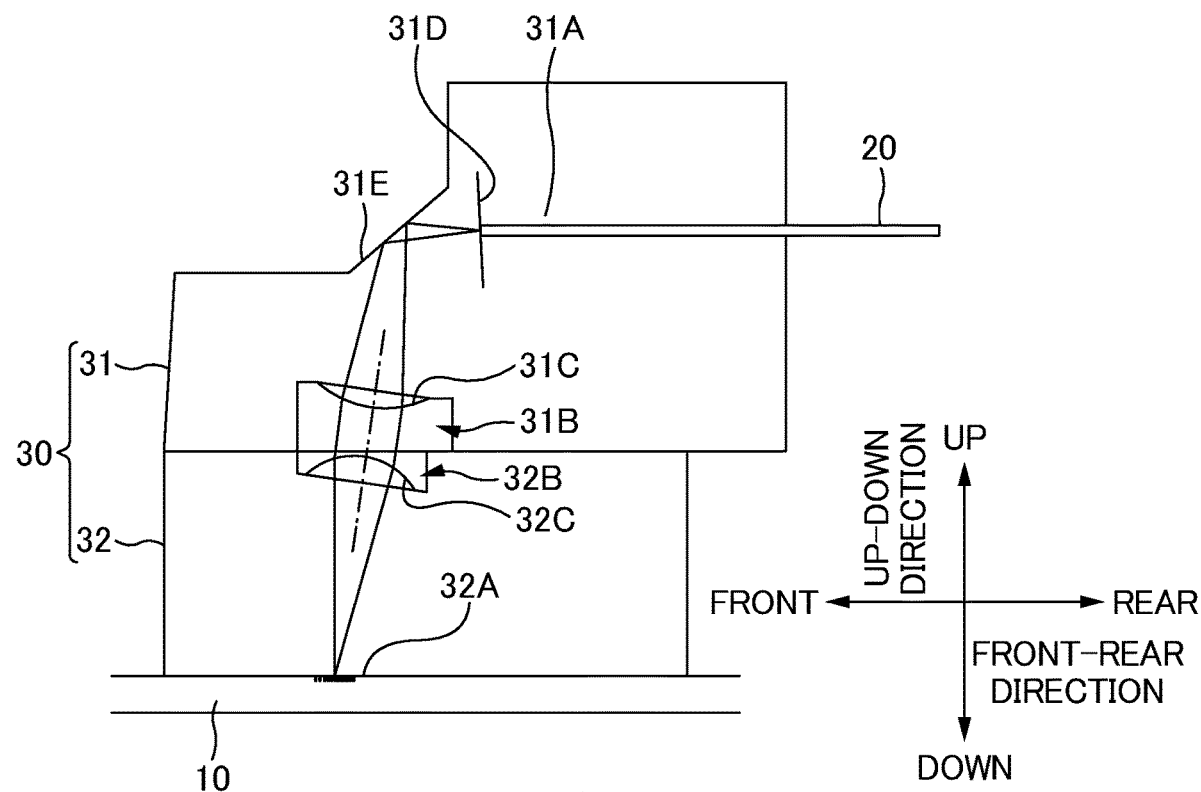
FIG. 1A is a cross-sectional view of an optical connection structure according to one or more embodiments.

At least the following matters are disclosed by the description below and the drawings.

Disclosed is an optical connector system including: an optical path-changing device including a fiber-holding part holding a single-mode optical fiber along a first direction, and a reflection surface configured to reflect an optical signal; and a relay device configured to be provided on a substrate having a grating coupler for inputting/outputting an optical signal in a second direction that is inclined with respect to a direction perpendicular to a surface of the substrate. The optical path-changing device and the relay device each have an input/output surface to/from which an optical signal is to be inputted/outputted. The input/output surface of the optical path-changing device and the input/output surface of the relay device are each provided with a convex lens. The single-mode optical fiber and the grating coupler are optically coupled by inputting/outputting collimated light of the optical signal between the convex lens of the optical path-changing device and the convex lens of the relay device, and changing a direction of the optical signal by the reflection surface of the optical path-changing device. With this optical connector system, a grating coupler and a single-mode optical fiber can be optically connected (optically coupled) with high accuracy.

The thermal expansion coefficient of the relay device may be closer to the thermal expansion coefficient of the substrate than the thermal expansion coefficient of the optical path-changing device. With this configuration, it is possible to reduce influence on optical connection caused by a difference in thermal expansion between the optical path-changing device and the substrate.

The optical axis of the convex lens of the optical path-changing device may be inclined with respect to the direction perpendicular to the surface of the substrate and is along the second direction. With this configuration, it is possible to suppress loss of optical signals caused by aberration (coma aberration or astigmatic aberration).

The optical axis of the convex lens of the relay device may be inclined with respect to the direction perpendicular to the surface of the substrate and is along the second direction. With this configuration, it is possible to suppress loss of optical signals caused by aberration (coma aberration or astigmatic aberration).

The fiber-holding part may be configured to hold a plurality of the single-mode optical fibers that are aligned in a width direction; the optical path-changing device may have three positioning pins that are aligned in the width direction; the relay device may have three positioning holes that are aligned in the width direction and into which the three positioning pins are respectively fitted; the positioning hole that is in center, among the three positioning holes aligned in the width direction, may be an elongate hole that is elongate in the first direction; and the two positioning holes on respective sides, among the three positioning holes aligned in the width direction, may be each an elongate hole that is elongate in the width direction. With this configuration, it is possible to suppress the influence of positional errors at the time of thermal expansion. Also, fitting can be achieved, even in cases where there are manufacturing errors in the positions of the positioning pins and the positioning holes.

The optical path-changing device may include an inclined surface that is inclined with respect to a plane perpendicular to the first direction, and an abutting part that is constituted by a surface perpendicular to the first direction, and that comes into contact with a cladding of the single-mode optical fiber; and, in a state where the cladding of the single-mode optical fiber is abutting against the abutting part, a core of the single-mode optical fiber is located in opposition to the inclined surface. With this configuration, it is possible to improve the accuracy of the abutting position, and also suppress transmission loss.

Also disclosed is an optical connection structure including: an optical path-changing device including a fiber-holding part holding a single-mode optical fiber along a first direction, and a reflection surface configured to reflect an optical signal; a substrate having a grating coupler for inputting/outputting an optical signal in a second direction that is inclined with respect to a direction perpendicular to a surface of the substrate; and a relay device provided on the substrate. The optical path-changing device and the relay device each have an input/output surface to/from which an optical signal is to be inputted/outputted. The input/output surface of the optical path-changing device and the input/output surface of the relay device are each provided with a convex lens. The single-mode optical fiber and the grating coupler are optically coupled by inputting/outputting collimated light of the optical signal between the convex lens of the optical path-changing device and the convex lens of the relay device, and changing a direction of the optical signal by the reflection surface of the optical path-changing device. With this optical connection structure, a grating coupler and a single-mode optical fiber can be optically connected with high accuracy.

SUMMARY

Figure 1B:
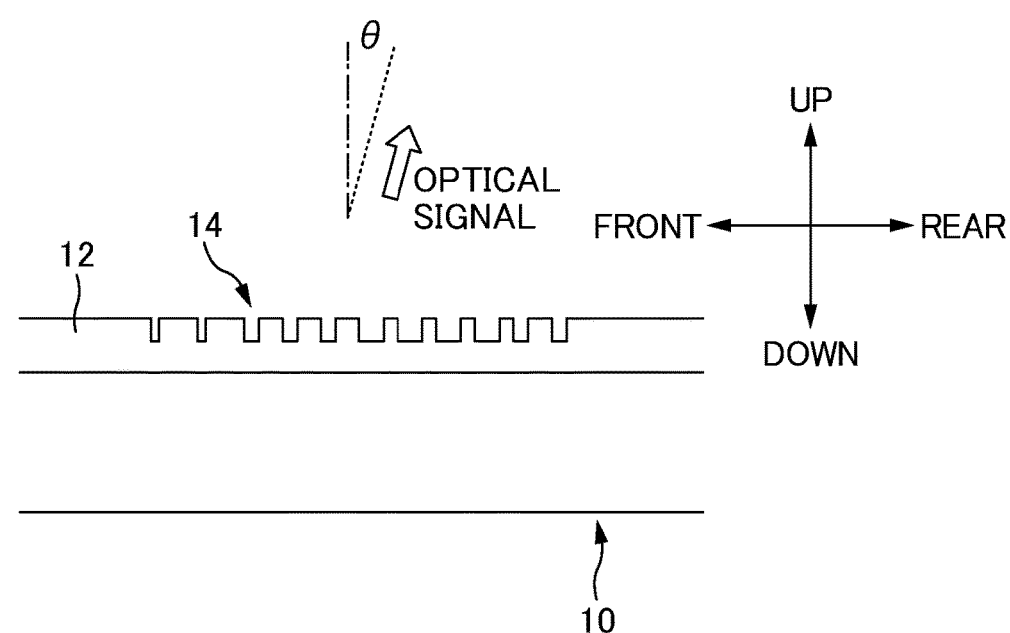
FIG. 1B is an enlarged cross-sectional view of a substrate 10.

FIG. 1A is a cross-sectional view of an optical connection structure according to one or more embodiments, and FIG. 1B is an enlarged cross-sectional view of a substrate 10.

Herein, "front-rear direction" and "up-down direction" are defined as follows. The front-rear direction is the direction of the optical axis of a single-mode optical fiber 20, and is the direction parallel to a surface of a substrate 10 (referred to also as "substrate surface"). In the front-rear direction, the side toward the end surface of the single-mode optical fiber 20 is defined as "front", whereas the opposite side therefrom is defined as "rear". The up-down direction is the direction perpendicular to the substrate surface. In the up-down direction, the side on which the single-mode optical fiber 20 is located as viewed from the substrate 10 is defined as "up", whereas the opposite direction therefrom is defined as "down". The front-rear direction may also be referred to as "first direction". The direction parallel to an optical path of an optical signal between a grating coupler 14 and a reflection surface 31E may be referred to as "second direction".

An optical connection structure according to one or more embodiments includes a substrate 10, a single-mode optical fiber 20, and an optical connector system 30.

The substrate 10 is a silicon substrate, and is provided with an optical waveguide 12 (silicon waveguide). The optical waveguide 12 is a transmission path for optical signals, and is formed on an upper part of the substrate 10. Forming the optical waveguide 12 on the substrate 10 (silicon substrate) can achieve significant size reduction compared to conventional quartz waveguides, and can offer a high thermo-optic constant. Also, manufacturing can be achieved by a complementary metal oxide semiconductor (CMOS) process, thus providing excellent affinity with electronic circuits.

A plurality of grooves are formed in the surface layer of the optical waveguide 12 of the substrate 10, thereby forming a grating coupler 14. The grating coupler 14 diffracts an optical signal propagating through the optical waveguide 12 and emits (outputs) the optical signal upward or downward (upward in one or more embodiments), and optically couples the optical signal to an optical fiber (single-mode optical fiber 20 in one or more embodiments). The grating coupler is also employed for optical coupling in the opposite direction (i.e., the direction from the single-mode optical fiber 20 to the optical waveguide 12). The grating coupler 14 is configured to input/output an optical signal in a direction (i.e., the second direction) that is inclined with respect to a direction perpendicular to the substrate surface (i.e., the up-down direction). In FIG. 1B, a direction in which the light emission performance or light reception performance of the grating coupler 14 becomes the greatest is depicted in approximation by a single line (dotted line). The angle θ illustrated in the figure is in the direction (i.e., the second direction) in which the intensity of light outputted from the grating coupler 14 becomes the greatest. The angle θ can be found by measuring the distribution of the intensity of light outputted from the grating coupler 14. The grating coupler 14 can be formed easily by photolithography.

The single-mode optical fiber 20 includes a core 21 in the central part, and a cladding 22 covering the periphery of the core 21 (see FIG. 3). The outside thereof is covered by, for example, an outer sheath 23 (see FIG. 5). The single-mode optical fiber 20 is a type of optical fiber that has a small core diameter and thereby transmits optical signals in a single mode. Therefore, with the single-mode optical fiber 20, signals are less likely to get degraded compared to multi-mode optical fibers, and the transmission distance of optical signals can be increased (i.e., long-distance transmission is possible). Note, however, that, since the core diameter is small, the single-mode optical fiber is vulnerable to bending, and also, misalignment at the time of connection increases attenuation. Thus, the optical path for optical signals needs to be designed with high accuracy. Note that, in the description below, the single-mode optical fiber 20 is also referred to as "SM optical fiber 20".

The optical connector system 30 is a member for providing optical connection (optical coupling) between the grating coupler 14 of the substrate 10 and the SM optical fiber 20, and includes an optical path-changing device 31 and a relay device 32.

The optical path-changing device 31 is a member configured to change the direction of a light transmission path (optical path), and is made from a transparent resin in one or more embodiments. Examples of transparent resins that may be used include polyetherimide (PEI), polycarbonate (PC), and cyclic olefin copolymer (COC). The optical path-changing device 31 includes a fiber-holding part 31A, a recess 31B, a lens 31C, a fiber-side input/output surface 31D, and a reflection surface 31E.

The fiber-holding part 31A is a member configured to fix (hold) an end part of the SM optical fiber 20 along the front-rear direction (first direction). In one or more embodiments, the fiber-holding part 31A is constituted by a V-shaped groove 31F and a top plate 312, as described further below. The fiber-holding part is, however, not limited thereto, and may have any configuration so long as it is capable of holding an end part of the SM optical fiber 20. For example, the fiber-holding part may be a fiber hole.

The recess 31B is a section that is depressed upward in the lower surface (i.e., the interface with the relay device 32) of the optical path-changing device 31. As illustrated in FIG. 1A, the recess 31B's bottom surface (i.e., the upper end part of the depression in one or more embodiments) is inclined with respect to the substrate surface (i.e., plane perpendicular to the up-down direction). More specifically, the recess 31B's bottom surface is perpendicular to the second direction.

The lens 31C is provided to the recess 31B, and is formed in a convex shape toward the lower side (i.e., the lens is a convex lens). The lens surface of the lens 31C is a surface (an input surface in one or more embodiments) to/from which an optical signal is to be inputted/outputted, and constitutes the optical path-changing device 31's input/output surface on the substrate 10 side. Since the lens 31C is provided on the recess 31B's bottom surface (which is an inclined surface), the optical axis of the lens 31C is inclined with respect to the direction perpendicular to the substrate surface. More specifically, the optical axis of the lens 31C is parallel to the second direction. The lens surface of the lens 31C may have an AR coating applied thereto. Applying an AR coating can prevent reflection that may occur at the interface between the lens 31C and air, and thereby suppress loss of optical signals. (The same applies to the later-described lens 32C.)

The fiber-side input/output surface 31D is a surface (an output surface in one or more embodiments) where an optical signal is to be inputted/outputted from/to the end surface of the SM optical fiber 20. The fiber-side input/output surface 31D is slightly inclined with respect to the up-down direction (see FIG. 7).

The reflection surface 31E is a flat surface (flat face) configured to reflect an optical signal. No lens is provided to the reflection surface 31E according to one or more embodiments. The reason to this will be described further below.

The relay device 32 is a member provided between the optical path-changing device 31 and the substrate 10. The relay device 32 is capable of propagating an optical signal, and is made from a material having a thermal expansion coefficient that is closer to the thermal expansion coefficient of the substrate 10 (silicon) than the thermal expansion coefficient of the optical path-changing device 31 (transparent resin). In one or more embodiments, the relay device 32 is made from quartz glass (silica glass), but is not limited thereto, and may be made from other materials (such as borosilicate glass). For example, the thermal expansion coefficient of the optical path-changing device 31 (transparent resin) may be 60 ppm, whereas the thermal expansion coefficient of the substrate 10 and that of the relay device 32 may be within a range from 3 to 8 ppm. The relay device 32 includes a substrate-side input/output surface 32A, a recess 32B, and a lens 32C.

The substrate-side input/output surface 32A is a surface configured to oppose the substrate 10, and is a surface (an input surface in one or more embodiments) to/from which an optical signal is to be inputted/outputted.

The recess 32B is a section that is depressed downward in the upper surface of the relay device 32. The recess 32B is provided in a position opposing the recess 31B in the optical path-changing device 31. The recess 31B and the recess 32B together form a void. The recess 32B's bottom surface is parallel to the recess 31B's bottom surface. Stated differently, the recess 32B's bottom surface is inclined with respect to the substrate surface (i.e., plane perpendicular to the up-down direction), and is perpendicular to the second direction.

The lens 32C is provided to the recess 32B, and is formed in a convex shape toward the upper side (i.e., the lens is a convex lens). The lens surface of the lens 32C is a surface (an output surface in one or more embodiments) to/from which an optical signal is to be inputted/outputted, and constitutes the relay device 32's input/output surface on the SM optical fiber 20 side. Since the lens 32C is provided on the recess 32B's bottom surface, the optical axis of the lens 32C is inclined with respect to the direction perpendicular to the substrate surface. More specifically, the optical axis of the lens 32C is parallel to the second direction, and is parallel to the optical axis of the lens 31 of the optical path-changing device 31. The lens surface of the lens 32C may have an AR coating applied thereto.

Figure 2A:
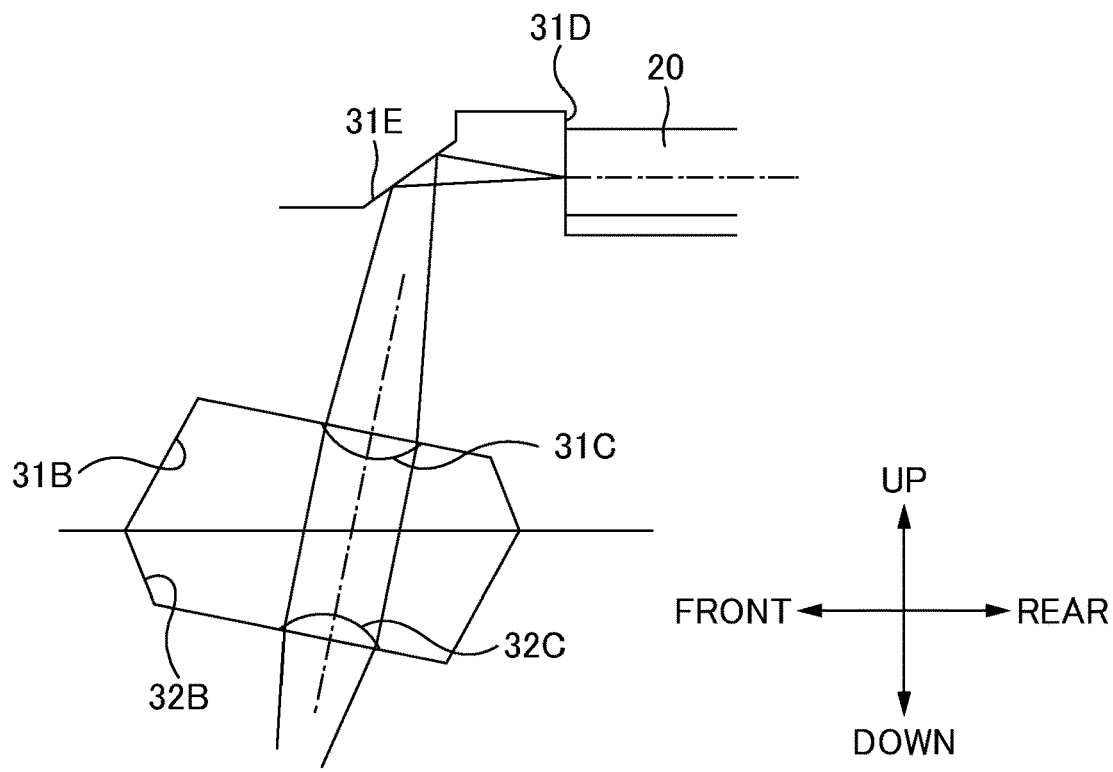
FIG. 2A is a diagram illustrating a lens arrangement according to one or more embodiments.
Figure 2B:
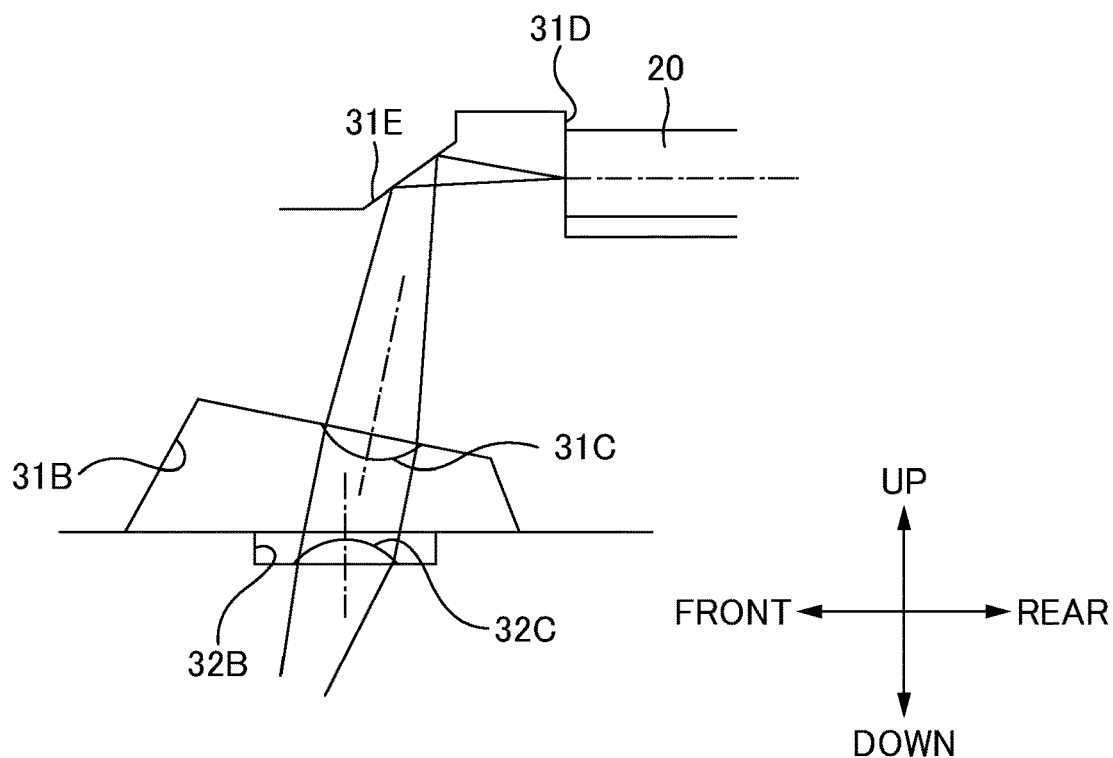
FIG. 2B is a diagram illustrating a modified example of a lens arrangement.

FIG. 2A is a diagram illustrating a lens arrangement according to one or more embodiments, and FIG. 2B is a diagram illustrating a modified example of a lens arrangement. The dot-and-dash line in the figures illustrates the optical axis.

As illustrated in FIG. 2A, in one or more embodiments, both the recess 31B's bottom surface and the recess 32B's bottom surface are inclined with respect to the substrate surface. Also, both the lens 31C provided in the recess 31B and the lens 32C provided in the recess 32B are inclined with respect to the substrate surface. More specifically, the optical axis of the lens 31C and the optical axis of the lens 32C are inclined with respect to the up-down direction so as to extend along the second direction. The direction of the optical signal outputted from the grating coupler 14 is in the second direction; so, by arranging the lens 31C and the lens 32C in opposition with one another such that their optical axes are along the second direction, it is possible to suppress loss of optical signals caused by aberration (coma aberration or astigmatic aberration).

In the modified example illustrated in FIG. 2B, the recess 32B's bottom surface is perpendicular to the up-down direction, and thus, the lens 32C is not inclined (i.e., the optical axis of the lens 32C is in the direction perpendicular to the substrate 10).

Optical coupling is possible even with this modified example, in cases where aberration is within a permissible range, or in cases where aberration can be corrected by using a special lens (such as an aspheric lens) for the lens 32C. According to the modified example, the relay device 32 can be manufactured easily because the recess 32B and the lens 32C do not need to be inclined. Particularly, in cases where, as in one or more embodiments, the relay device 32 is made from silica which is difficult to process, the configuration of the modified example—in which the recess 32B and the lens 32C are not inclined—is advantageous in terms of manufacturing the relay device 32.

The optical axis of the lens 31C may also be in the direction perpendicular to the substrate 10, like the modified example illustrated in FIG. 2B. However, the lens 31C of the optical path-changing device 31 may be shaped such that its optical axis is inclined with respect to the direction perpendicular to the substrate 10 as illustrated in FIG. 2B, because the optical path-changing device 31, which is made from resin, is easier to shape compared to the relay device 32 made from silica, which is difficult to process.

Optical Connection:

An optical signal propagating through the optical waveguide 12 is diffracted by the grating coupler 14, and is outputted in a direction (second direction) inclined by angle θ with respect to the direction (up-down direction) perpendicular to the substrate surface.

The optical signal outputted from the grating coupler 14 is inputted to the substrate-side input/output surface 32A of the relay device 32 and propagates through the interior of the relay device 32. At this time, the optical path is along the second direction and is inclined with respect to the up-down direction.

After propagating through the interior of the relay device 32, the optical signal is outputted from the lens 32C of the relay device 32. At this time, the outputted optical signal is substantially collimated into collimated light. The optical signal (collimated light) propagates through the void between the relay device 32 and the optical path-changing device 31 (i.e., the void formed by the recess 32B and the recess 31B; between the lens 32C and the lens 31C). Also at this time, the optical path is along the second direction and is inclined with respect to the up-down direction.

The optical signal that propagated through the void is inputted to the lens 31C of the optical path-changing device 31, and gradually converges toward the end surface of the optical fiber. In this way, the optical signal propagates between the lens 31C and the reflection surface 31E. (The optical path therebetween is also along the second direction and is inclined with respect to the up-down direction.)

The optical signal is then reflected by the reflection surface 31E, and the optical path is changed. (The optical path of the optical signal is changed from the second direction to the first direction.)

The reflected optical signal propagates between the reflection surface 31E and the fiber-side input/output surface 31D. At this time, the optical path is in a direction (first direction) parallel to the substrate 10. Then, the optical signal is outputted from the fiber-side input/output surface 31D toward the end surface of the SM optical fiber 20. (Also at this time, the optical path is in the first direction.)

Figure 3A:
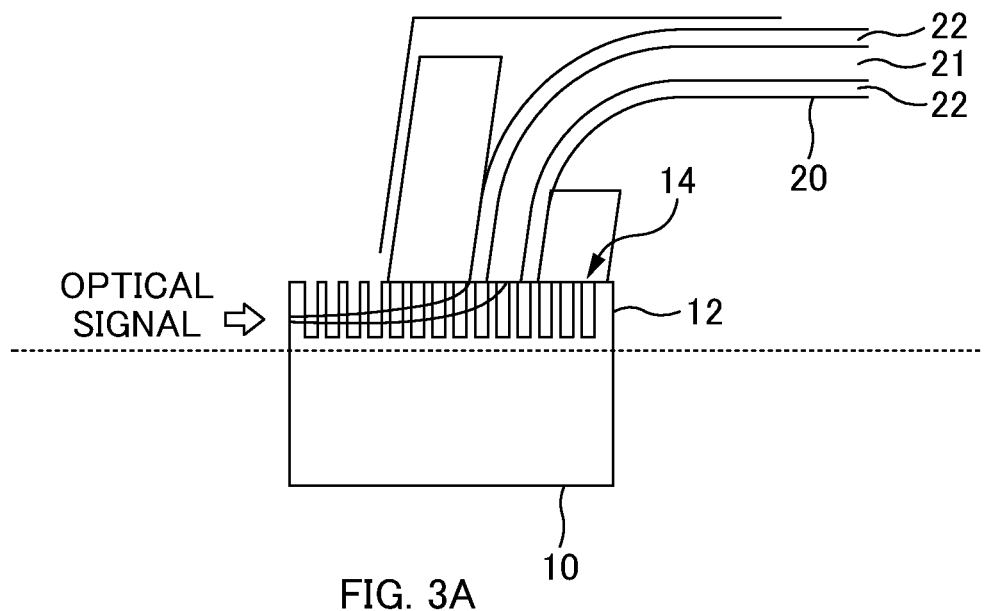
FIG. 3A is a diagram illustrating an optical connection structure according to a first comparative example.
Figure 3B:
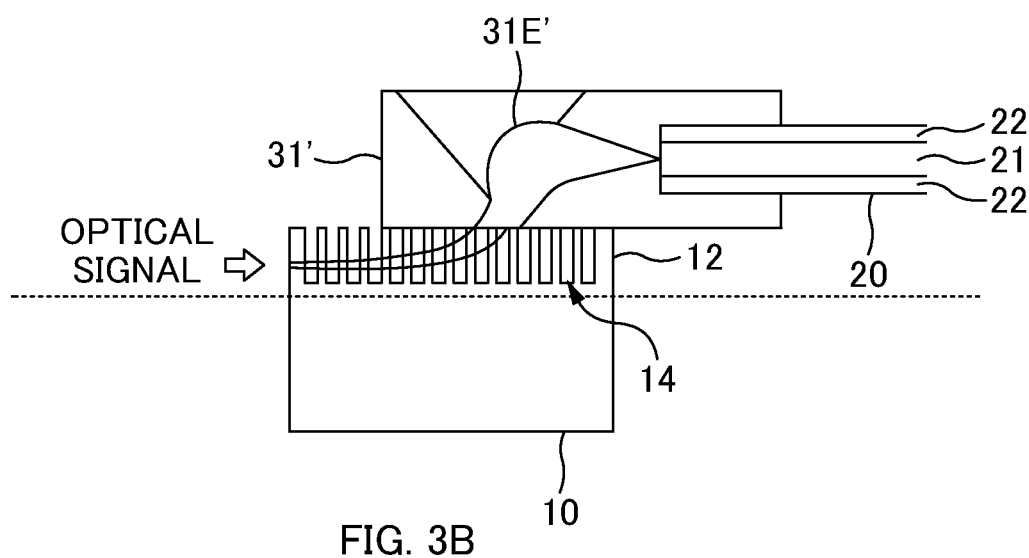
FIG. 3B is a diagram illustrating an optical connection structure according to a second comparative example.

FIG. 3A is a diagram illustrating an optical connection structure according to a first comparative example, and FIG. 3B is a diagram illustrating an optical connection structure according to a second comparative example.

In the first comparative example (FIG. 3A), no optical path-changing device is provided, and instead, the SM optical fiber 20 is bent toward the substrate 10. In the first comparative example, the SM optical fiber 20 needs to be used in a bent state. In this case, because of tolerance in bending (fiber bending curvature), which is based on the physical limit of the fiber itself, it is difficult to reduce the dimension in the height direction. (Particularly, the SM optical fiber 20 is more vulnerable to bending than multi-mode optical fibers.) Also, the first comparative example requires additional costs for components for retaining the bent fiber as well as additional number of steps for bending the fiber.

In one or more embodiments, the optical path is changed by employing the optical path-changing device 31. Therefore, there is no need to bend the SM optical fiber 20. Thus, the dimension in the height direction can be reduced.

In the second comparative example (FIG. 3B), an optical path-changing device 31' is arranged directly on the substrate 10. The optical path-changing device 31E' is made from a transparent resin, like the optical path-changing device 31E, and has a reflection surface 31E'. Note that a lens is provided to the reflection surface 31E' (i.e., the reflection surface 31E' is not a flat surface).

As described above, the substrate 10 is made from silicon, whereas the optical path-changing device 31' is made from resin (transparent resin). Thus, there is a great difference in thermal expansion between the substrate 10 and the optical path-changing device 31'. Therefore, even if the optical path-changing device 31' is fixed (e.g., bonded) to the substrate 10, peeling may occur between the substrate 10 and the optical path-changing device 31' when there is a change in temperature environment, and this may create difficulty in achieving optical connection between the substrate 10 and the optical path-changing device 31' (and may increase loss of optical signals).

In contrast, in one or more embodiments, the relay device 32 is arranged between the substrate 10 and the optical path-changing device 31. The difference in thermal expansion between the substrate 10 (silicon) and the relay device 32 (silica glass) is small. Thus, issues in optical connection due to differences in thermal expansion are less likely to arise between the substrate 10 and the relay device 32 (Reason 1).

Further, optical connection is achieved by collimated light between the relay device 32 and the optical path-changing device 31. Thus, loss of optical signals can be suppressed, even if there is a difference in thermal expansion between the relay device 32 and the optical path-changing device 31 (Reason 2).

For Reasons 1 and 2 described above, according to one or more embodiments, the grating coupler 14 and the SM optical fiber 20 can be optically connected with high accuracy.

In the second comparative example, a lens is provided to the reflection surface 31E'. Such a configuration, wherein a lens is formed on the reflection surface, will require extremely strict shaping accuracy, because surface changes will have a large impact. Also, manufacturing errors are likely to become conspicuous.

In contrast, in one or more embodiments, the reflection surface 31E is a flat surface, and is not provided with a lens. Thus, according to one or more embodiments, the shaping accuracy is not called for as required in the second comparative example, and also, manufacturing errors are less conspicuous (described below). Further, making the reflection surface 31E flat facilitates total reflection of the inclined light from the grating coupler 14.

Incidentally, when light is inputted from outside to a transparent resin, the light refracts at the incident surface. If there is angular deviation in the incident surface, the angular deviation of light propagating through the transparent resin (i.e., light refracted at the incident surface) will be about half the angular deviation of the incident surface (estimate based on the refractive index of a typical transparent resin). In contrast, in cases where the optical path is changed by causing light that has propagated through the interior of the transparent resin to be reflected at the reflection surface, if there is angular deviation in the reflection surface, the angular deviation of light after the optical path change (i.e., light reflected by the reflection surface) will be twice the angular deviation of the reflection surface. So, when comparing a configuration wherein a lens is formed on the light input/output surface and a configuration wherein a lens is formed on the reflection surface, the influence due to shaping errors will differ by fourfold. Therefore, by providing the lens 31C to the light input/output surface of the optical path-changing device 31 while making the reflection surface 31E flat as in one or more embodiments, influence due to shaping errors in the optical path-changing device 31 can be mitigated, compared to the second comparative example wherein the lens is provided to the reflection surface 31E'. In configurations where single-mode optical fibers are used as in one or more embodiments, it is particularly important to mitigate the influence due to shaping errors in the optical path-changing device 31, because optical paths for optical signals need to be designed with high accuracy.

The optical connection structure of one or more embodiments described above includes: the substrate 10 having the grating coupler 14 for inputting/outputting an optical signal in the second direction, which is inclined with respect to the up-down direction; and the optical connector system 30 configured to optically couple the SM optical fiber 20 and the grating coupler 14. The optical connector system 30 includes: the optical path-changing device 31 including the fiber-holding part 31A configured to hold the SM optical fiber 20 along the first direction, and the reflection surface 31E configured to reflect an optical signal; and the relay device 32 configured to be provided on the substrate 10.

The optical path-changing device 31 and the relay device 32 each have an input/output surface to/from which an optical signal is to be inputted/outputted. The input/output surface of the optical path-changing device 31 is provided with the lens 31C (convex lens), and the input/output surface of the relay device 32 is provided with the lens 32C (convex lens).

The SM optical fiber 20 and the grating coupler 14 are optically coupled by inputting/outputting collimated light of the optical signal between the lens 31C of the optical path-changing device 31 and the lens 32C of the relay device 32, and changing the direction of the optical signal by the reflection surface 31E of the optical path-changing device 31. With this configuration, the grating coupler 14 and the SM optical fiber 20 can be optically connected with high accuracy.

In one or more embodiments, the material (silica glass) used for the relay device 32 has a thermal expansion coefficient that is closer to the thermal expansion coefficient of the substrate 10 (silicon) than the thermal expansion coefficient of the optical path-changing device 31 (transparent resin). With this configuration, it is possible to reduce influence on optical connection caused by a difference in thermal expansion between the optical path-changing device 31 and the substrate 10.

In one or more embodiments, the optical axis of the lens 31C of the optical path-changing device 31 is inclined with respect to the up-down direction so as to extend along the second direction. With this configuration, it is possible to suppress loss of optical signals caused by aberration (coma aberration or astigmatic aberration).

In one or more embodiments, the optical axis of the lens 32C of the relay device 32 is inclined with respect to the up-down direction so as to extend along the second direction. With this configuration, it is possible to suppress loss of optical signals caused by aberration (coma aberration or astigmatic aberration).

Figure 4:
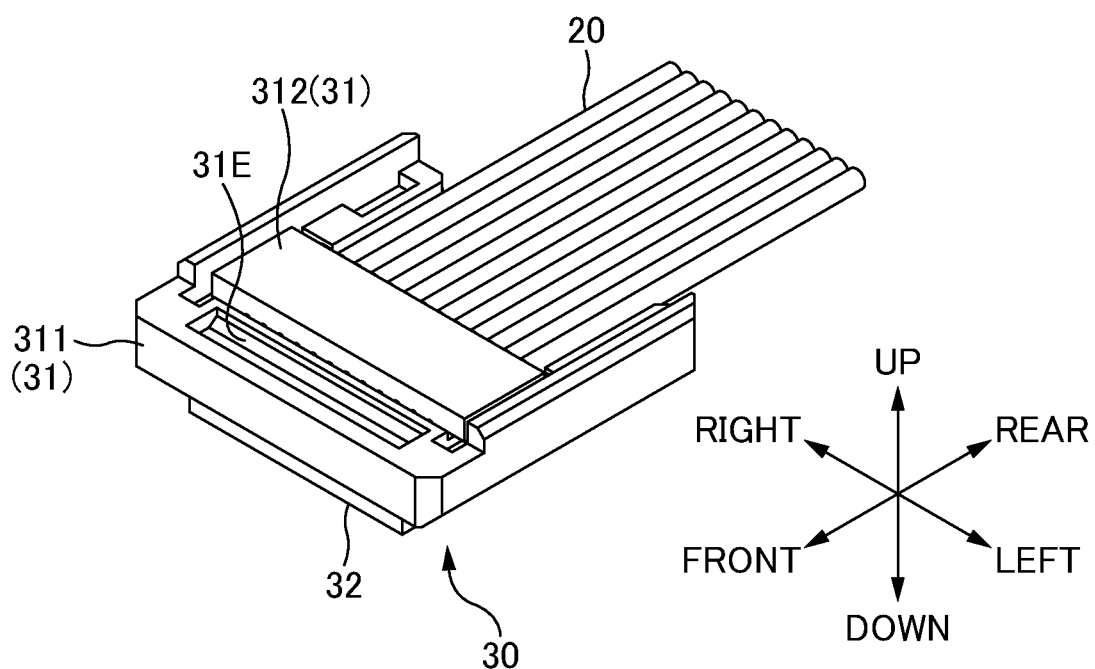
FIG. 4 is an overall perspective view of an optical connector system 30 according to one or more embodiments.
Figures 5A, 5B:
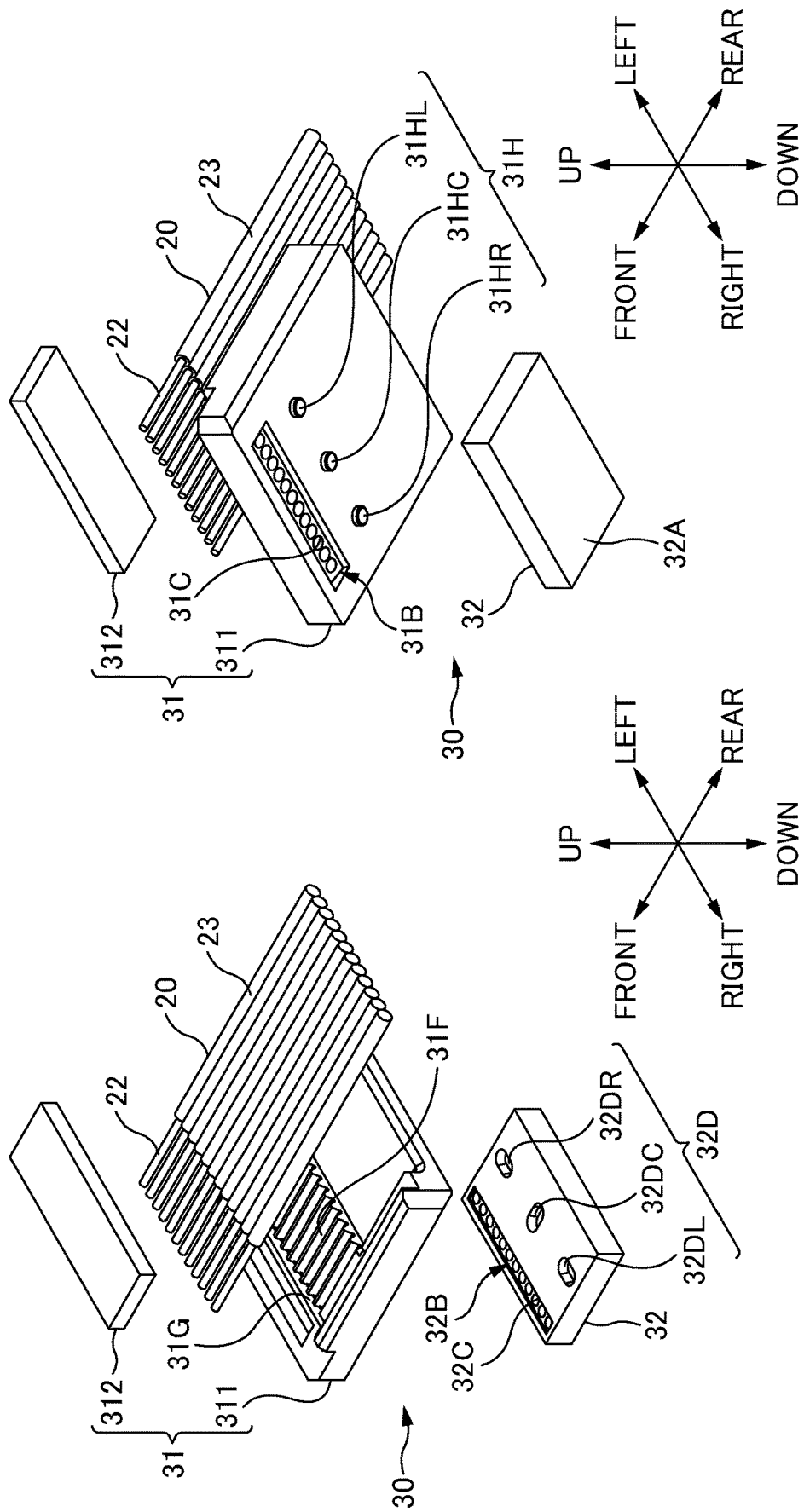
FIGS. 5A and 5B are exploded views of the optical connector system 30.

Concrete Structure of Optical Connector System 30:

FIG. 4 is an overall perspective view of an optical connector system 30 according to one or more embodiments. FIGS. 5A and 5B are exploded views of the optical connector system 30.

"Front-rear direction", "up-down direction", and "left-right direction" are defined below. The front-rear direction and the up-down direction are the same as in FIG. 1, so explanation is omitted. The left-right direction is the direction orthogonal to the up-down direction and the front-rear direction. In the left-right direction, the right-hand side as viewed from the rear toward the front is defined as "right", whereas the left-hand side is defined as "left". The left-right direction may also be referred to as "width direction".

As described above, the optical connector system 30 includes an optical path-changing device 31 and a relay device 32. The optical connector system 30 according to one or more embodiments is configured to optically connect grating couplers 14 of a substrate 10 and a plurality of SM optical fibers 20. The plurality of SM optical fibers 20 are aligned (juxtaposed) in the left-right direction (width direction). It should be noted that a plurality of grating couplers 14 are aligned (juxtaposed) in the left-right direction (width direction) on the substrate 10, which is not illustrated in FIG. 4.

The optical path-changing device 31 includes a body part 311 and a top plate 312.

The body part 311 is a member constituting the body of the optical path-changing device 31, and includes a recess 31B, lenses 31C, a fiber-side input/output surface 31D, a reflection surface 31E, V-shaped grooves 31F, an abutting part 31G, and positioning pins 31H.

The recess 31B is a section that is depressed upward in the lower surface (i.e., the interface with the relay device 32) of the optical path-changing device 31, and is formed so as to be elongate in the left-right direction, as illustrated in FIG. 5B. The recess 31B's bottom surface is inclined with respect to the up-down direction.

A plurality of lenses 31C are provided in the recess 31B so as to be aligned (juxtaposed) in the left-right direction (as a lens array). The plurality of lenses 31C respectively correspond to the plurality of SM optical fibers 20. The optical axis of each lens 31C is inclined with respect to the up-down direction.

The fiber-side input/output surface 31D is a surface (an output surface in one or more embodiments) where an optical signal is to be inputted/outputted from/to the respective end surfaces of the SM optical fibers 20. As described above, the fiber-side input/output surface 31D is slightly inclined with respect to the up-down direction.

The reflection surface 31E is a flat surface (flat face) configured to reflect an optical signal (i.e., change the optical path).

The V-shaped grooves 31F are groove sections each having a V-shaped cross section, and are provided more toward the rear than the reflection surface 31E. The plurality of V-shaped grooves 31F respectively correspond to the plurality of SM optical fibers 20, and are aligned (juxtaposed) in the left-right direction. An end part of the SM optical fiber 20 is arranged in each V-shaped groove 31F.

The abutting part 31G is a section against which the end surface (front end surface) of each SM optical fiber 20 abuts, and is constituted by a surface (also referred to as "abutting surface") perpendicular to the optical axis (first direction). The abutting surface comes into contact with the cladding 22 at the end surface of each SM optical fiber 20 (described further below).

The positioning pins 31H are projections that project downward from the lower surface of the body part 311, and are provided more toward the SM optical fiber 20 side (i.e., toward the rear) than the reflection surface 31E. In one or more embodiments, three positioning pins 31H (right-side pin 31HR, left-side pin 31HL, and central pin 31HC) are aligned in the left-right direction with intervals therebetween. The three positioning pins 31H each have the same shape (circular-cylindrical shape).

The right-side pin 31HR is provided on the rightmost side among the three positioning pins 31H. The left-side pin 31HL is provided on the leftmost side among the three positioning pins 31H. The central pin 31HC is provided between (in the middle of) the right-side pin 31HR and the left-side pin 31HL. The three positioning pins 31H (the right-side pin 31HR, left-side pin 31HL, and central pin 31HC) are respectively inserted (fitted) into three positioning holes 32D (right-side hole 32DR, left-side hole 32DL, and central hole 32DC) in the relay device 32. Thus, the optical path-changing device 31 and the relay device 32 are positioned with respect to one another.

The top plate 312 is a plate-shaped member arranged above the V-shaped grooves 31F of the body part 311. The top plate 312 is arranged above the V-shaped grooves 31F in a state where the SM optical fibers 20 are respectively arranged in the V-shaped grooves, and thereby, the SM optical fibers 20 are fixed (held) by being sandwiched between the respective V-shaped grooves 31F and the top plate 312. Stated differently, the top plate 312 and the V-shaped grooves 31F serve as a "fiber-holding part 31A" configured to hold the SM optical fibers 20. Note that, instead, fiber holes may be formed, and an end part of each SM optical fiber 20 may be inserted and fixed (held) in the respective fiber hole, as described above.

The relay device 32 includes a substrate-side input/output surface 32A, a recess 32B, lenses 32C, and positioning holes 32D.

The substrate-side input/output surface 32A is a surface configured to oppose the substrate 10, and is a surface to/from which an optical signal is to be inputted/outputted.

The recess 32B is a section that is depressed downward in the upper surface of the relay device 32, and is formed so as to be elongate in the left-right direction. The recess 32B's bottom surface is inclined with respect to the substrate surface (i.e., plane perpendicular to the up-down direction).

A plurality of lenses 32C are provided in the recess 32B so as to be aligned (juxtaposed) in the left-right direction (as a lens array). The plurality of lenses 32C correspond respectively to the plurality of SM optical fibers 20 and respectively to the plurality of lenses 31C. The optical axis of each lens 32C is inclined with respect to the up-down direction.

The positioning holes 32D are holes (elongate holes in one or more embodiments) into which the positioning pins 31H of the optical path-changing device 31 are respectively inserted to thereby achieve positioning between the optical path-changing device 31 and the relay device 32. Three positioning holes 32D (right-side hole 32DR, left-side hole 32DL, and central hole 32DC) are provided in the relay device 32 so as to respectively correspond to the three positioning pins 31H of the optical path-changing device 31.

The right-side hole 32DR is a hole into which the right-side pin 31HR is inserted, and is provided on the rightmost side among the three positioning holes 32D. The right-side hole 32DR is formed as an elliptic hole whose long axis extends in the left-right direction (i.e., as an elongate hole that is elongate in the width direction). The length of the short axis (minor axis) of the ellipse is substantially equal to the diameter of the positioning pin 31H. The length of the long axis (major axis) is greater than the diameter of the positioning pin 31H. (The same applies to the left-side hole 32DL and the central hole 32DC.)

The left-side hole 32DL is a hole into which the left-side pin 31HL is inserted, and is provided on the leftmost side among the three positioning holes 32D. The left-side hole 32DL is also formed as an elliptic hole whose long axis extends in the left-right direction (i.e., as an elongate hole that is elongate in the width direction). Stated differently, the long axis of the left-side hole 32CL extends in the same direction as the long axis of the right-side hole 32DR.

The central hole 32DC is a hole into which the central pin 31HC is inserted, and is provided in the middle between the right-side hole 32DR and the left-side hole 32DL. The central hole 32DC is formed as an elliptic hole whose long axis extends in the front-rear direction (i.e., as an elongate hole that is elongate in the first direction). Stated differently, the direction of the long axis of the central hole 32DC is different from the direction of the long axis of the right-side hole 32DR and that of the left-side hole 32DL.

FIG. 6A is a diagram illustrating an arrangement of a positioning part (positioning holes 32D and positioning pins 31H) in the optical connector system 30 according to one or more embodiments, and FIG. 6B is a diagram illustrating an arrangement of a positioning part according to a comparative example.

The comparative example (FIG. 6B) includes a right-side pin 31HR and a left-side pin 31HL as positioning pins 31H, and includes a right-side hole 32DR' and a left-side hole 32DL as positioning holes 32D. The center-to-center distance between the right-side pin 31HR and the left-side pin 31HL is length L. Note that the right-side hole 32DR' is a hole having a shape (i.e., circular shape) corresponding to the outer shape of the positioning pin 31H. In this comparative example, a positional error proportional to the length L will arise at the time of thermal expansion, depending on the difference in thermal expansion coefficient between the optical path-changing device 31 and the relay device 32.

In one or more embodiments (FIG. 6A), the positioning pins 31H are respectively fitted into the corresponding positioning holes 32D, and then, the central pin 31HC is bonded and fixed in the central hole 32DC (whereas the right-side pin 31HR and the right-side hole 32DR, as well as the left-side pin 31HL and the left-side hole 32DL, are only fitted together without being fixed). In this case, the influence of positional error between the optical path-changing device 31 and the relay device 32 at the time of thermal expansion is only half that of the comparative example. Further, since the long axis of the central hole 32DC is along the front-rear direction (i.e., the direction perpendicular to the left-right direction), the three positioning pins 31H can be fitted respectively into the corresponding positioning holes 32D, even if there is manufacturing error in the position of the positioning pin 31H or the positioning hole 32D.

Figure 7:
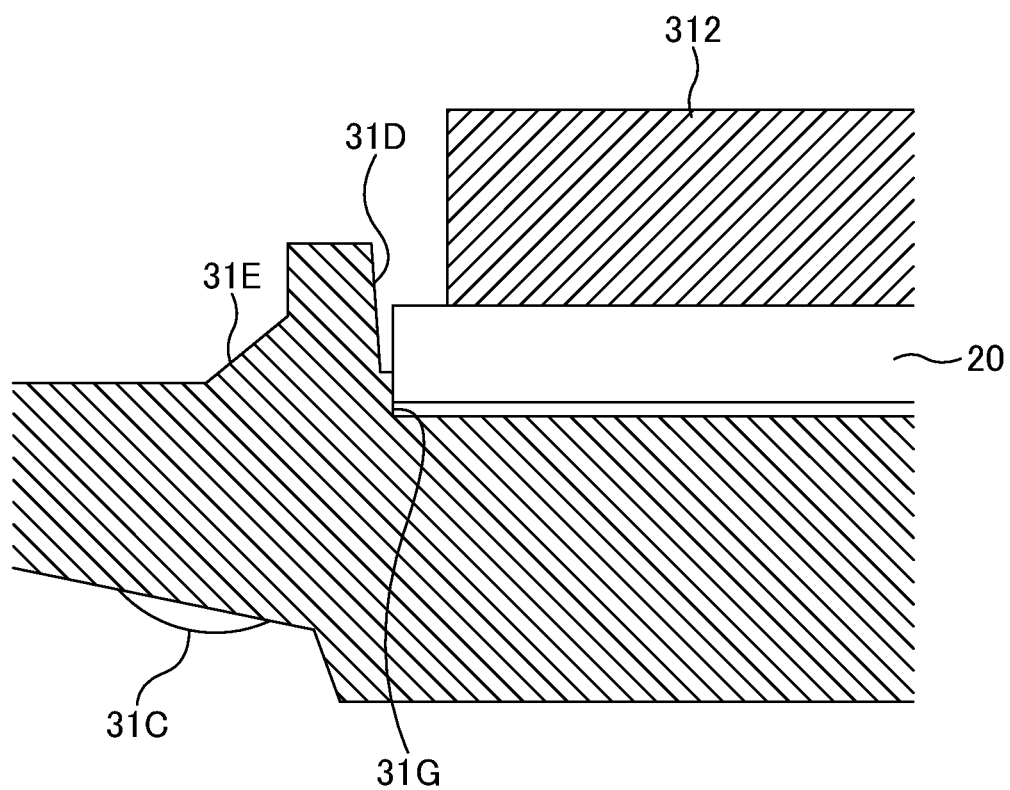
FIG. 7 is an enlarged cross-sectional view in the vicinity of a fiber-side input/output surface 31D.

FIG. 7 is an enlarged cross-sectional view in the vicinity of the fiber-side input/output surface 31D. As illustrated in the figure, the end surface of the SM optical fiber 20 is a surface perpendicular to the optical axis (first direction).

The abutting part 31G comes into contact with the cladding 22 at the end surface of the SM optical fiber 20 (but does not contact the core 21 of the SM optical fiber 20). The abutting part 31G's contact surface (abutting surface) with the SM optical fiber 20 is a surface perpendicular to the optical axis (first direction). Thus, positional accuracy can be improved compared to cases of abutting the SM optical fiber 20 against an inclined surface.

The fiber-side input/output surface 31D (corresponding to the "inclined surface") is provided above the abutting part 31G, and is slightly inclined with respect to a plane perpendicular to the first direction. The angle of this inclination is optimized in accordance with the refractive index of the material of the optical path-changing device 31 (transparent resin in one or more embodiments). In a state where the cladding 22 of the SM optical fiber 20 is abutting against the abutting part 31G, the core 21 of the SM optical fiber 20 is located in opposition to the fiber-side input/output surface 31D. Thus, it is possible to suppress transmission loss (or suppress the influence of reflection of optical signals on the fiber-side input/output surface 31D).

Other Embodiments

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

In the foregoing embodiments, a transparent resin is used for the optical path-changing device 31, but the material is not limited thereto, and any material that allows passage of optical signals may be used. For example, the same material as that for the relay device 32 (e.g., silica glass) may be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10: Substrate;
12: Optical waveguide;
14: Grating coupler;
20: Single-mode optical fiber;
21: Core;
22: Cladding;
23: Outer sheath;
30: Optical connector system;
31: Optical path-changing device;
31A: Fiber-holding part;
31B: Recess;
31C: Lens;
31D: Fiber-side input/output surface;
31E: Reflection surface;
31F: V-shaped groove;
31G: Abutting part;
31H: Positioning pin;
31HR: Right-side pin;
31HL: Left-side pin;
31HC: Central pin;
32: Relay device;
32A: Substrate-side input/output surface;
32B: Recess;
32C: Lens;
32D: Positioning hole;
32DR: Right-side hole;
32DL: Left-side hole;
32DC: Central hole.

The invention claimed is:

1. An optical connector system comprising:
an optical path-changing device comprising:
a fiber-holding part that holds a single-mode optical fiber along a first direction; and
a reflection surface that reflects an optical signal; and
a relay device on a substrate, wherein
the substrate comprises a grating coupler for inputting/outputting an optical signal in a second direction that is inclined with respect to a direction perpendicular to a surface of the substrate,
the optical path-changing device and the relay device each have an input/output surface to/from which the optical signal is inputted/outputted,
a first convex lens is disposed on the input/output surface of the optical path-changing device,
a second convex lens is disposed on the input/output surface of the relay device,
the single-mode optical fiber is optically coupled to the grating coupler by
inputting/outputting collimated light of the optical signal between the first convex lens and the second convex lens, and
changing a direction of the optical signal by the reflection surface of the optical path-changing device,
the fiber-holding part holds a plurality of single-mode optical fibers that are aligned in a width direction,
the optical path-changing device further comprises three positioning pins that are aligned in the width direction,
the relay device has three positioning holes that are aligned in the width direction and into which the three positioning pins are respectively fitted,
a central hole of the three positioning holes is elongated in the first direction, and
two other holes of the three positioning holes are elongated in the width direction.

2. The optical connector system according to claim 1, wherein a thermal expansion coefficient of the relay device is closer to a thermal expansion coefficient of the substrate than a thermal expansion coefficient of the optical path-changing device.

3. The optical connector system according to claim 1, wherein an optical axis of the first convex lens is along the second direction.

4. The optical connector system according to claim 1, wherein an optical axis of the second convex lens is along the second direction.

5. The optical connector system according to claim 1, wherein
the optical path-changing device further comprises:
an inclined surface that is inclined with respect to a plane perpendicular to the first direction; and an abutting part that is constituted by a surface perpendicular to the first direction and that contacts with a cladding of the single-mode optical fiber, and in a state where the cladding of the single-mode optical fiber abuts against the abutting part, a core of the single-mode optical fiber opposes the inclined surface.

6. An optical connection structure comprising:

an optical path-changing device comprising:
   a fiber-holding part that holds a single-mode optical fiber along a first direction; and
   a reflection surface that reflects an optical signal;

a substrate that comprises a grating coupler for inputting/outputting an optical signal in a second direction that is inclined with respect to a direction perpendicular to a surface of the substrate; and a relay device on the substrate, wherein the optical path-changing device and the relay device each have an input/output surface to/from which an optical signal is inputted/outputted, a first convex lens is disposed on the input/output surface of the optical path-changing device, a second convex lens is disposed on the input/output surface of the relay device, the single-mode optical fiber is optically coupled to the grating coupler by
   inputting/outputting collimated light of the optical signal between the first convex lens and the second convex lens, and
   changing a direction of the optical signal by the reflection surface of the optical path-changing device, the fiber-holding part holds a plurality of single-mode optical fibers that are aligned in a width direction, the optical path-changing device further comprises three positioning pins that are aligned in the width direction, the relay device has three positioning holes that are aligned in the width direction and into which the three positioning pins are respectively fitted, a central hole of the three positioning holes is elongated in the first direction, and two other holes of the three positioning holes are elongated in the width direction.

* * * * *